United States Patent [19]

Silfvast

[11] Patent Number: 4,592,064
[45] Date of Patent: May 27, 1986

[54] INNER-SHELL D-ELECTRON PHOTOIONIZATION APPARATUS

[75] Inventor: William T. Silfvast, Holmdel, N.J.

[73] Assignee: AT&T Bell Laboratories, Murray Hill, N.J.

[21] Appl. No.: 537,634

[22] Filed: Sep. 30, 1983

[51] Int. Cl.$^4$ .............................................. H01S 3/09
[52] U.S. Cl. .......................................... 372/73; 372/76; 372/5
[58] Field of Search .................... 372/5, 69, 70, 76, 73

[56] References Cited

U.S. PATENT DOCUMENTS 3,900,803  8/1975  Silfvast et al. .................. 331/94.5 P

OTHER PUBLICATIONS

"Photoionization with Atomic Beams. II. Cadmium Atoms between 8.99 and 83 eV and Zinc Atoms between 27.35 and 65 eV", *J. Chem. Physics*, vol. 51, No. 12, pp. 5440–5443, (1969), R. B. Cairns, et al.
Caro et al.; "Soft X-Ray Pumping of Metastable Levels of Li+", *Applied Phys. Lett.*, vol. 42, No. 1, Jan. 1983.
Rozanov; "Feasibility of Producing an Inverted Medium by Photoionization of the Inner Electrons in Atoms"; *JETP Lett.*, vol. 12, No. 10, pp. 340–342, Nov. 20, 1970.
S. E. Harris, J. F. Young, R. W. Falcone, J. E. Rothenberg, J. R. Willison and J. C. Wang, "Anti-Stokes Scattering as an XUV Radiation Source and Flashlamp," *Laser Techniques for Extreme Ultraviolet Spectroscopy*, American Institute of Physics, 1982, pp. 137–152.
M. A. Duguay, "Soft X-Ray Lasers Pumped by Photoionization," *Laser Induced Fusion and X-Ray Laser Studies*, eds. S. F. Jacobs et al, Addison-Wesley Publishing Co., Reading, Mass., 1976, pp. 557–579.
S. A. Mani, H. A. Hyman and J. D. Daugherty, "Lithium-Ion Soft X-Ray Laser," *Journal of Applied Physics*, vol. 47, No. 7, Jul. 1976, pp. 3099–3106.
M. A. Duguay and P. M. Rentzepis, "Some Approaches to Vacuum UV and X-Ray Lasers," *Applied Physics Letters*, vol. 10, No. 12, Jun. 15, 1967, pp. 350–352.
H. A. Hyman and S. A. Mani, "Effect of Autoionizing States on the Proposed Lithium Soft X-Ray Laser," *Optics Communications*, vol. 20, No. 2, Feb. 1977, pp. 209–213.
S. E. Harris, R. W. Falcone, M. Gross, R. Normandin, K. D. Pedrotti, J. E. Rothenberg, J. C. Wang, J. R. Willison, and J. F. Young, "Anti-Stokes Scattering as an XUV Radiation Source," *Laser Spectroscopy V*, Jun. 29–Jul. 3, 1981, pp. 437–445.

*Primary Examiner*—Léon Scott, Jr.
*Attorney, Agent, or Firm*—Michael J. Urbano

[57] ABSTRACT

Described is a high gain, soft X-ray pumped, inner-shell, photoionization amplifier/laser in Cd or Zn vapors. The soft X-ray photoionization, generated by a laser-produced plasma or other high intensity X-ray source, preferentially removes inner-shell d-electrons from neutral atoms leaving them ionized in a $^2$D state and producing a population inversion with respect to a lower lying $^2$p state. Also described are techniques for achieving inversions with respect to the ion ground state of Cd, Zn or Hg by optically pumping from the inner-shell ionized state to a higher energy level. Isoelectronic scaling of Cd, Zn and Hg suggests similar lasing phenomena exist, for example, in Ga, In and Tl ions, respectively, and also higher iso-electronic sequences.

27 Claims, 9 Drawing Figures

INNER-SHELL D-ELECTRON PHOTOIONIZATION APPARATUS

BACKGROUND OF THE INVENTION

This invention relates to lasers and, more particularly, to lasers in which a population inversion is established by preferential removal of inner-shell d-electrons. The term "inner-shell" means any electron shell other than the outermost populated orbit for a given atom. The term "d-electron" corresponds to the standard quantum mechanical designation of the orbital angular momentum which includes the s, p, d, f . . . electrons having values of 0, 1, 2, 3 . . . .

Duguay and Rentzepis, *Applied Physics Letters*, Vol. 10, p. 350 (1967), first suggested theoretically the possibility of producing population inversions in the vacuum ultraviolet and X-ray spectral regions by X-ray photoionization of inner-shell p-electrons in atomic species such as Na and Cu. A detailed summary of this concept was given by Duguay in *Laser Induced Fusion and X-Ray Laser Studies*, edited by S. F. Jacobs et al, Addison-Wesley, Reading, Mass., p. 557 (1976), in which he pointed out the necessity for rapid pumping (e.g., about 50 psec risetime pulses for Na; femtoseconds for Cu) due to the short lifetime of the proposed upper laser levels. In addition, however, a population inversion is difficult to achieve because the lower laser level is an ion ground state which becomes rapidly filled due to electron collisional excitation of ground state neutral atoms. In order to reduce the requirement for rapid pumping, Mani et al, *Journal of Applied Physics*, Vol 47, p. 3099 (1976), proposed theoretically the use of He-like species such as $Li^+$, whereby the removal of the inner-shell s-electron leaves the species in a metastable S-state, and the inversion is produced with respect to the ground state by rapid laser transfer of the population to a nearby P-state. (The upper case designations S, P, D . . . refer to the total orbital angular momentum and have values 0, 1, 2 . . . as for s, p, d.)

Harris et al in *Laser Spectroscopy* V, edited by A. R. W. McKellar et al, Springer-Verlag, New York, p. 437 (1981), proposed the transfer of energy from $Li^+$ metastable levels to potential laser levels in neutral Li lying well above the ionization energy, by resonance pumping with an efficient, tunable anti-Stokes Raman source. In each of these proposals, high intensity broadband X-ray pumping sources, such as laser-produced plasmas, are used to rapidly produce the photoionized states. In order to alleviate the problems associated with producing a satisfactory X-ray filter to separate the X-ray source region from the region to be pumped, Harris et al in *Laser Techniques for Extreme Ultraviolet Spectroscopy*, edited by T. J. McIlrath et al, American Institute of Physics, p. 147 (1982), proposed theoretically that the X-ray plasma be produced within the volume of the Li vapor by focusing a 1.06 μm laser onto a tantalum target within the vapor. Using this technique, Caro et al, *Applied Physics Letters*, Vol. 42, p. 9 (1983), were able to produce $Li^+$ metastable densities as high as $6 \times 10^{14}$ $cm^{-3}$ a few mm away from a tantalum target, but they did not construct a working laser according to the Harris proposal. To date, there has been no report that the Harris laser has been built and successfully operated.

SUMMARY OF THE INVENTION

In accordance with my invention, a high gain laser is achieved by X-ray photoionization which preferentially removes an inner-shell d-electron from a neutral atom in a "target" state (an energy level in which atoms absorb X-rays), thereby ionizing the atom into an excited D-state. In some embodiments the lower laser level is a higher lying state (such as a P-state) rather than a ground state (S-state). Such a lower laser level has a much smaller cross-section for electron collisional excitation than a ground state. Therefore, it tends to be populated considerably less by that mechanism, thus facilitating the attainment of a population inversion.

This scheme permits high gain to be achieved at visible and UV wavelengths in species such as Cd and Zn. For example, a soft X-ray-pumped, inner-shell, photoionization laser has been produced in Cd vapor at 4416 Å and 3250 Å. A very high gain of 5.6 $cm^{-1}$ has been measured at 4416 Å, and a reasonably high energy storage of 0.2 $mJ/cm^3$ in the upper laser states has been obtained. Because of the highly selective cross-section for broadband pumping of the upper laser level, this system has the potential to become an efficient high power laser (e.g., comparable to excimer or $CO_2$ lasers).

In other embodiments, a transfer laser is utilized to pump the excited D-state to a still higher P-state from which transitions to an S-ground state permit lasing at VUV wavelengths of less than 1000 Å in Group II species such as Cd, Zn and Hg.

In still another embodiment, the target state may be an ion ground state produced, for example, by resonance pumping of Ga atoms or ionization of In atoms from their neutral ground state to the target state. These systems are capable of lasing at 1150 Å and 1085 Å in Ga and at 1533 Å and 1850 Å in In and are iso-electronic with Zn and Cd, respectively. Still higher iso-electronic species may also be made to lase in this fashion.

In general, therefore, my invention includes means for providing a population of atoms/ions in a relatively low energy target state, the ions also having, at a higher energy, upper and lower optically coupled laser levels, the upper laser level being nonmetastable, and means for creating a population inversion between the upper and lower laser levels including means for applying thereto X-ray pulses which have wavelengths effective to remove inner-shell d-electrons from the atoms/ions in the target state. In addition, the duration of the X-ray pulses should be less than the lifetime of the upper laser level. In some embodiments the upper laser level is reached directly by the X-ray photoionization. In others the X-rays pump the target state atoms/ions to an intermediate ion state, and a transfer laser is used to pump the latter to the upper laser level. In embodiments employing certain species, the target state is the ground state of neutral atoms, whereas in other embodiments, such as those employing iso-electronic species, the ground state neutral atoms are raised to a higher ion ground state which becomes the target state.

BRIEF DESCRIPTION OF THE DRAWING

My invention, together with its various features and advantages, can be readily understood from the following, more detailed description taken in conjunction with the accompanying drawing, in which.

DETAILED DESCRIPTION

Figure 1:
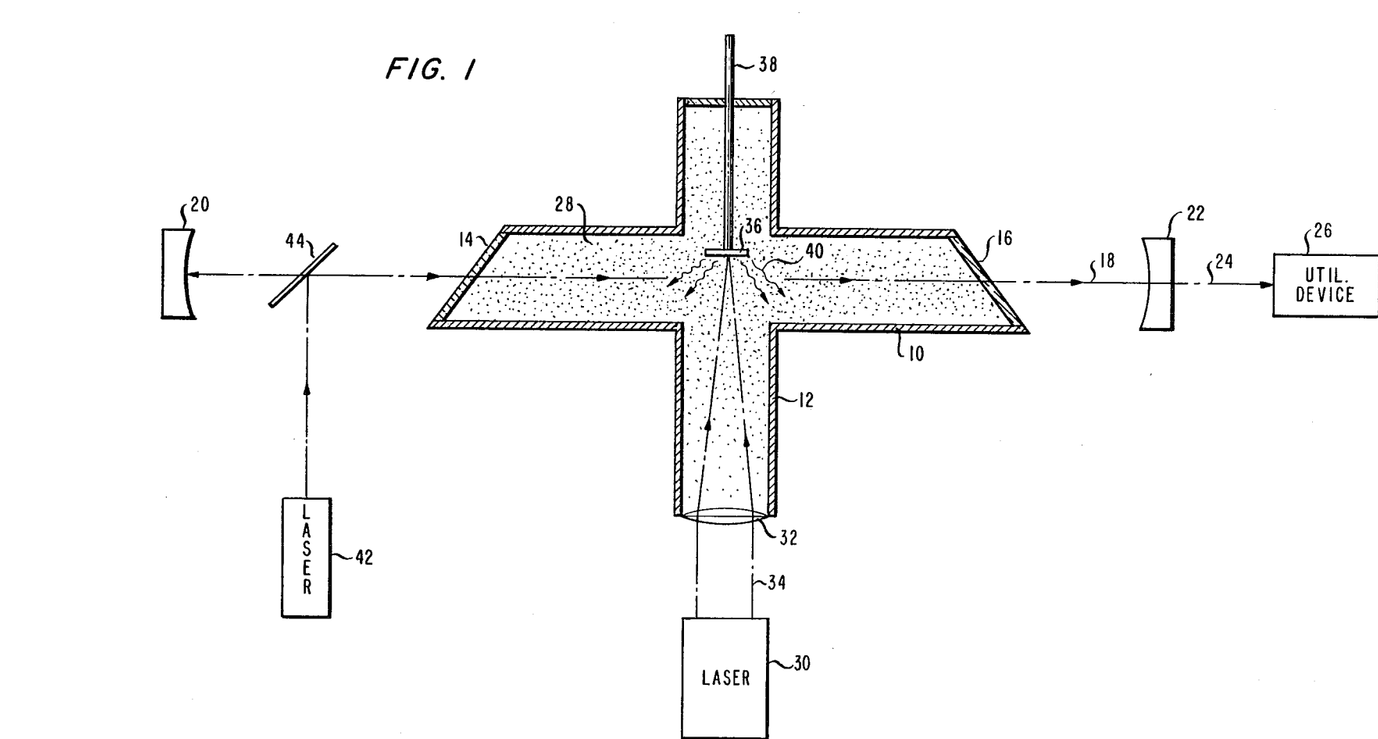
FIG. 1 is a schematic of illustrative apparatus used in practicing my invention.

With reference now to FIG. 1, there is shown a schematic of stimulated emission apparatus which may be used as either an optical amplifier or an optical oscillator (laser). The apparatus includes a cross-shaped tube having a longitudinal segment 10 and a transverse segment 12 which are in fluid-flow communication with one another. The longitudinal segment 10 has optional Brewster angle windows 14 and 16 at opposite ends thereof and is aligned along optical axis 18. When the apparatus is used as a laser, axis 18 coincides with the axis of an optical resonator (cavity) formed by a pair of curved mirrors 20 and 22. The mirror 20 is illustratively highly reflecting at the laser wavelength whereas the mirror 22 is partially transmissive at that wavelength so as to couple a portion 24 of the laser radiation to a utilization device 26. The cross-shaped tube forms a bounded volume for containing the active medium 28 of the laser in the form of atoms, ions and/or electrons typically in the gaseous phase. The active medium 28 is pumped by X-ray photoionization means which includes a high power pulsed laser 30, a lens 32 which focuses the output 34 of laser 30 through the transverse segment 12 onto a target 36 positioned approximately at the intersection of the segments 10 and 12. The target 36 is mounted on a rod 38 which extends through the other end of transverse segment 12 for manipulation purposes. The focused output of laser 30 impinges upon the target 36 and generates soft X-rays 40 which are absorbed by the active medium 28 in a fashion to be described later.

Optionally, a laser 42 may be coupled into the resonator, and hence into the active medium, via a beam splitter 44. The laser 42 may serve as a probe laser for measuring the optical gain of the laser of amplifier, or it may serve as a transfer laser for pumping the photoionized species to a higher energy level (also described in detail later).

Of course, it is well known in the art that the structure of FIG. 1, which depicts an oscillator, will function as an amplifier but in the latter case the mirrors 20 and 22 may be omitted since a resonator is not required.

Figure 2:
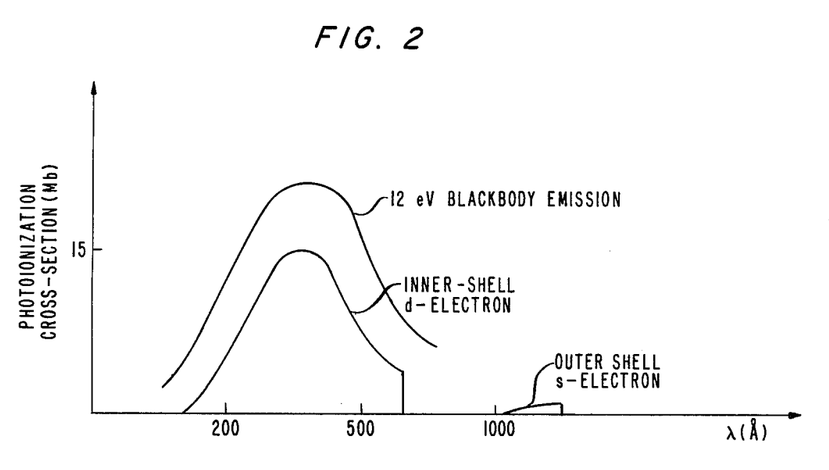
FIG. 2 is a graph of the photoionization cross-section for the 4d-electrons of Cd and of black-body emission at 12 eV.

To practice my invention, the X-ray photoionization means is chosen so that the X-rays 40 provide a black-body emission, as shown in FIG. 2, which overlaps the photoionization cross-section curve for the inner-shell d-electrons of the active medium 28. In addition, there must be provided a population of atoms/ions of the active medium in a target state; that is, an energy level which absorbs the X-rays 40 thereby causing inner-shell d-electrons to be preferentially removed from the atoms/ions leaving the atoms/ions in a higher energy level, illustratively an upper laser level. In this case, the intensity of the X-rays should also be sufficient to create a population inversion (optical gain) between the upper laser level and the lower laser level, the energy separation of which corresponds to the wavelength of the optical output 24. To this end, the X-rays 40 are supplied as pulses, the duration of which should be less than the lifetime of the upper laser level. Pulse durations ranging from about 10 nsec to 70 psec have been found useful, but even shorter or perhaps longer pulse durations may be suitable depending upon the particular active medium and the density of electrons generated by the X-rays (i.e., electron collisions with ions in the upper laser levels tend to shorten the lifetime of that state).

Figure 3:
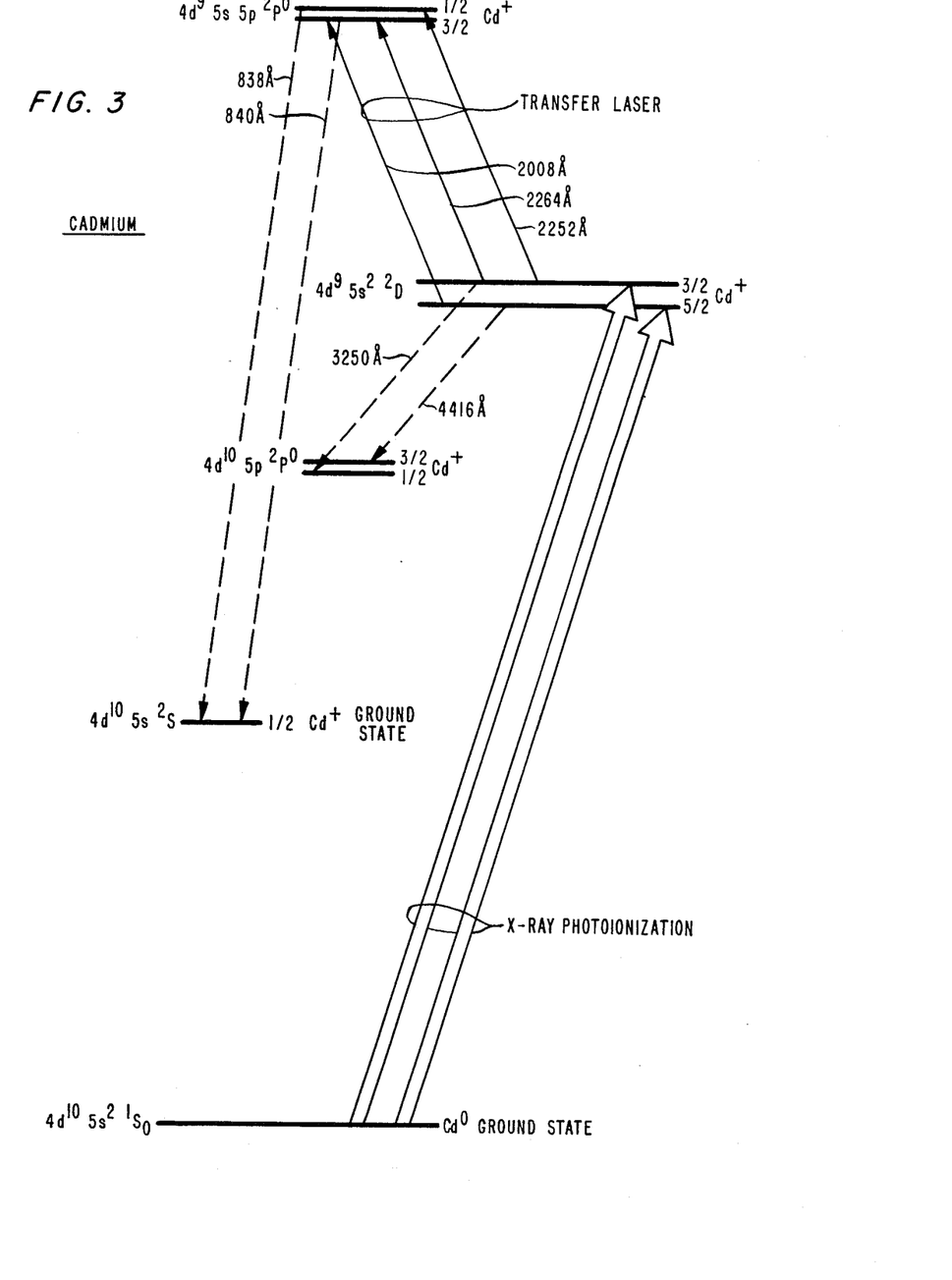
FIGS. 3–7 are energy level diagrams of Cd, Zn, Hg, Ga, and In, respectively, used to describe the operation of various embodiments of my invention.

As an illustration, consider the energy level scheme for Cd shown in FIG. 3. Illustratively, the neutral Cd ground state $4d^{10}5s^2$ $^1S_0$ is the target state, the singly ionized Cd+ doublet states $4d^95s^2$ $^2D_{3/2}$ and $^2D_{5/2}$ are the upper laser levels, and the singly ionized Cd+ doublet states $4d^{10}5p$ $^2P_{\frac{1}{2}}^0$ and $^2P_{3/2}^0$ are the respective lower laser levels which are optically coupled by allowed transitions at 3250 Å and 4416 Å, respectively. Prior to excitation, the active medium 28 consists primarily of neutral Cd atoms Cd$^0$ in the ground state. The X-rays 40 are absorbed by the neutral Cd atoms in the ground state (in this case, the target state) causing d-electrons in the fourth shell to be preferentially removed from the atoms leaving them as a singly ionized species Cd+ in the upper laser levels. These states have a nominal lifetime due to radiative decay of about 0.7 $\mu$sec which may actually be shortened to a few tens of nanoseconds or less due to electron collisions, the rate of which depends on the X-ray intensity. Thus, the upper laser levels are not metastable because, as is well-known in the art, metastable states in this case have much longer lifetimes, typically about 1,000 times longer or more. The transition to the lower laser levels occurs when one of the 5s-electrons falls into the d-shell, and the other 5s-electron moves to a larger orbit, becoming a 5p-electron.

Note that the energy of the X-rays need not equal the energy difference between the target state and the upper laser levels. In general, it is considerably greater. The excess energy, corresponding to the difference between the actual X-ray energy and the energy separation of the target state and the upper laser levels, is taken up by the removed 4d-electrons. Consequently, a broadband source of X-rays is suitable. FIG. 2, which shows the photoionization cross-section for Cd, illustrates this principle. The 12 eV black-body emission curve represents the spectrum of the X-rays 40, and the inner-shell d-electron curve corresponds to the probability (or cross-section) for removal of the 4d-electron. For Cd X-ray wavelengths of about 150–650 Å are useful, but for iso-electronic species the range is expected to shift to shorter wavelengths so that, for example, 50 Å x-rays may be suitable.

In an alternative embodiment, the laser 42 may be employed as a transfer laser to increase the energy of the Cd+ ions from the $^2D_{3/2}$ and $^2D_{5/2}$ levels to higher energy states, the $4d^95s5p$ $^2P_{\frac{1}{2}}^0$ and $^2P_{3/2}^0$ states, which are the upper laser levels. These states typically have lifetimes of a few nanoseconds or less and, as noted above are not metastable. In this configuration the $^2D$ states are an intermediate level rather than the upper laser level, and the $4d^{10}5s\ ^2S_{\frac{1}{2}}$ Cd+ ground state is the lower laser level. The upper laser levels are reached by pumping the $^2D$ intermediate states with a transfer laser at 2008 Å, 2205 Å or 2284 Å. The transfer laser should apply to the active medium optical pulses of duration shorter than the lifetime of the upper laser level. Well-known dye lasers and Raman shifted excimer lasers are suitable transfer lasers. Lasing is expected to occur at 838 Å and 840 Å. Although the lower laser level is a Cd+ ground state, it is at a relatively high energy of about 10 eV (as compared to the prior art ground state of Li+ which is at about 5 eV) and thus tends not to be undesirably populated by electron collisional excitation as rapidly as in the case of Li+.

Figure 4:
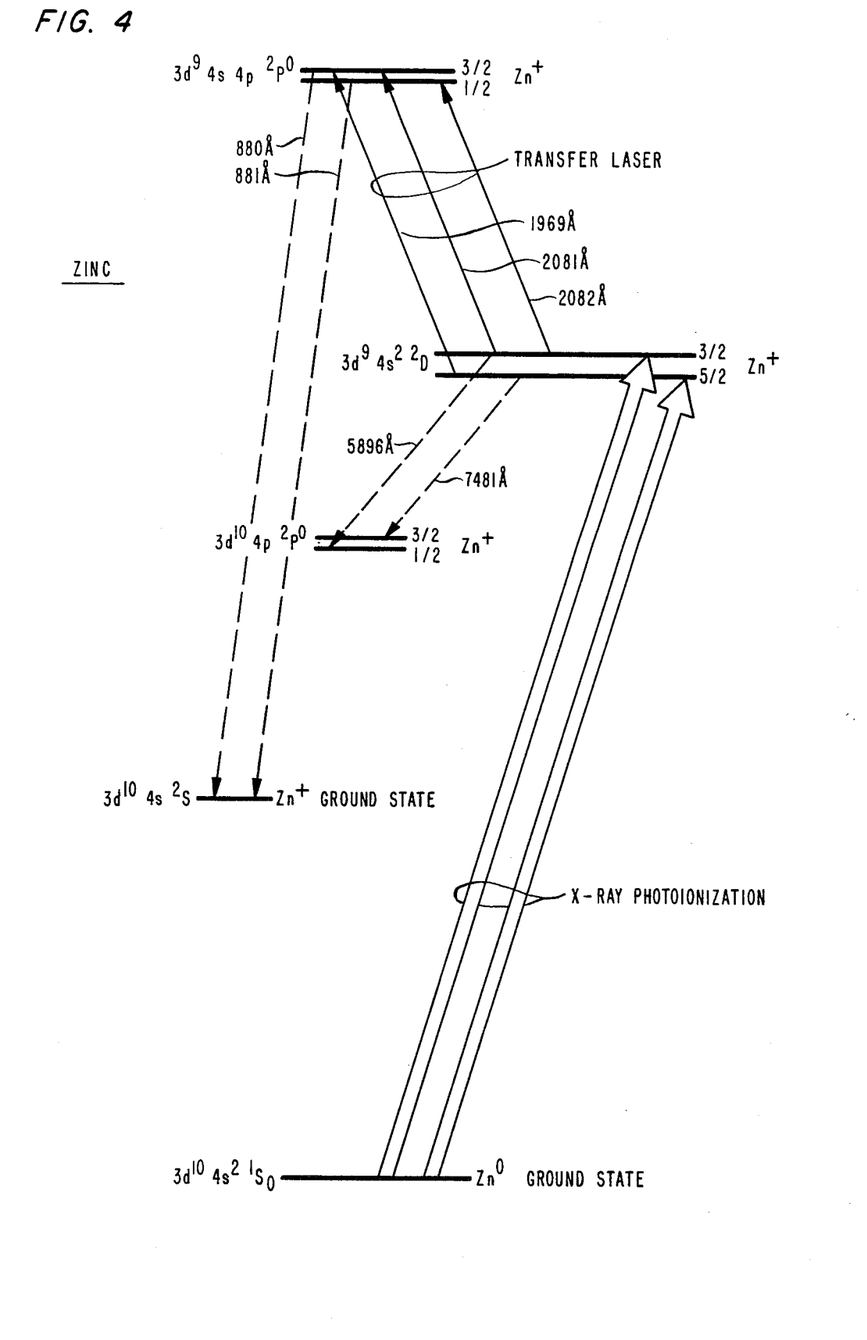

In a similar fashion, lasing has been achieved in Zn. As shown in FIG. 4, the target state is the Zn neutral atom ground state $3d^{10}4s^2\ ^1S$. In one configuration, the upper laser levels are the singly ionized $Zn^+ 3d^94s^2$ $^2D_{3/2}$ and $^2D_{5/2}$ energy states, and the respective lower laser levels are the singly ionized $Zn^+ 3d^{10}4p\ ^2P_{\frac{1}{2}}^0$ or $^2P_{3/2}^0$ energy states which are optically coupled by allowed transitions at 5896 Å and 7681 Å. As with Cd, an alternative configuration is the one in which the doublet $^2D$ energy states constitute intermediate levels which are pumped by means of a transfer laser at 1969 Å, 2081 Å or 2082 Å to upper laser Zn+ levels at higher energies identified as the $3d^94s4p\ ^2P_{3/2}^0$ or $^2P_{\frac{1}{2}}^0$ energy states. In this case, the upper laser levels are optically coupled to a lower laser level which is the Zn+ ground state $3d^{10}4s\ ^2S$. Lasing in this case is expected in the VUV at 881 Å and 880 Å. In both cases, however, the X-ray photoionization excites Zn neutral atoms from their ground state to the $^2D$ Zn+ states by the preferential removal of inner-shell 3d-electrons.

Figure 5:
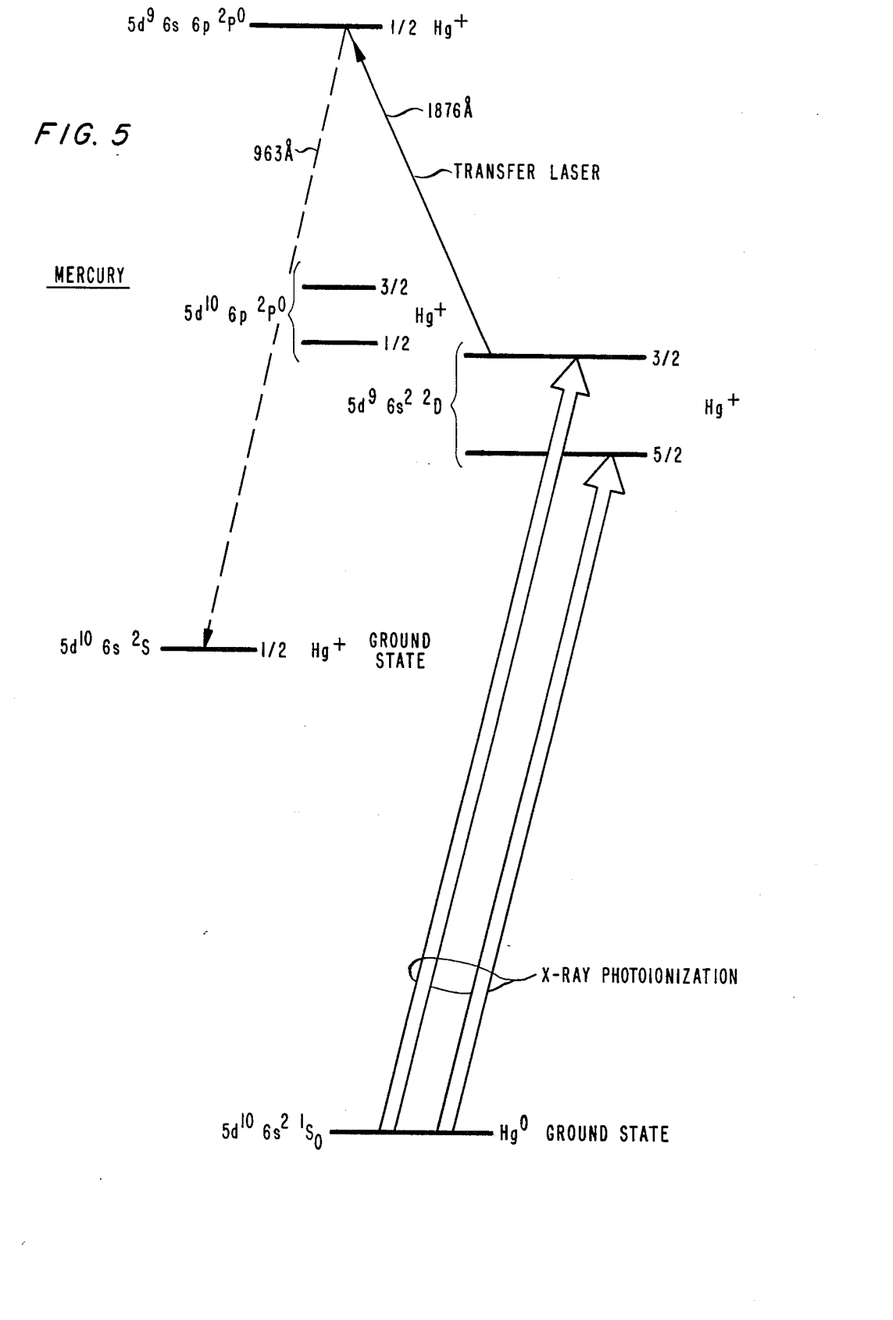

In the Hg system shown in FIG. 5, the target state is the neutral Hg atom ground state $5d^{10}6s^2\ ^1S$. X-ray photoionization removes inner-shell 5d-electrons from the neutral atoms, thereby ionizing them to the intermediate doublet Hg+ levels $5d^96s^2\ ^2D_{3/2}$ and $^2D_{5/2}$. Unlike Cd and Zn, the $5d^{10}6p\ ^2P_{3/2}^0$ and $^2P_{\frac{1}{2}}^0$ levels lie above these intermediate levels so that a population inversion between them cannot be created using the intermediate $^2D$ levels as the upper laser levels. However, the $^2D_{3/2}$ Hg+ states may be pumped by a transfer laser at 1876 Å to a higher energy state $5d^96s6p\ ^2P_{\frac{1}{2}}^0$. In this case, lasing is expected to occur at 963 Å between this level and the Hg+ ground state $5d^{10}6s\ ^2S_{\frac{1}{2}}$. To my knowledge, the $^2D_{5/2}$ energy level has not yet been identified but would also be a candidate for use with a transfer laser.

Lasing in other atomic species with similar energy level configurations is also possible. Of particular interest are the atoms which are iso-electronic with those described here because in those cases the preferential removal of an inner-shell d-electron occurs efficiently by the same X-ray photoionization process. For example, Ga is iso-electronic with Zn, In is iso-electronic with Cd, and Tl is iso-electronic with Hg. With the iso-electronic species, however, the energy level configuration which parallels that of the Group II elements involves more highly ionized species. For example, whereas X-ray photoionization in Cd and Zn began with neutral atoms in the target state, and lasing occurred between upper and lower laser levels in singly ionized states, in Ga and In the target state is the singly ionized state, and lasing occurs between upper and lower laser levels in doubly ionized states. Similar comments apply for still heavier iso-electronic species such as Ge which is iso-electronic with Zn and Ga, Pb which is iso-electronic with Cd and In, Sn which is iso-electronic with Hg and Tl, and so forth.

Figure 6:
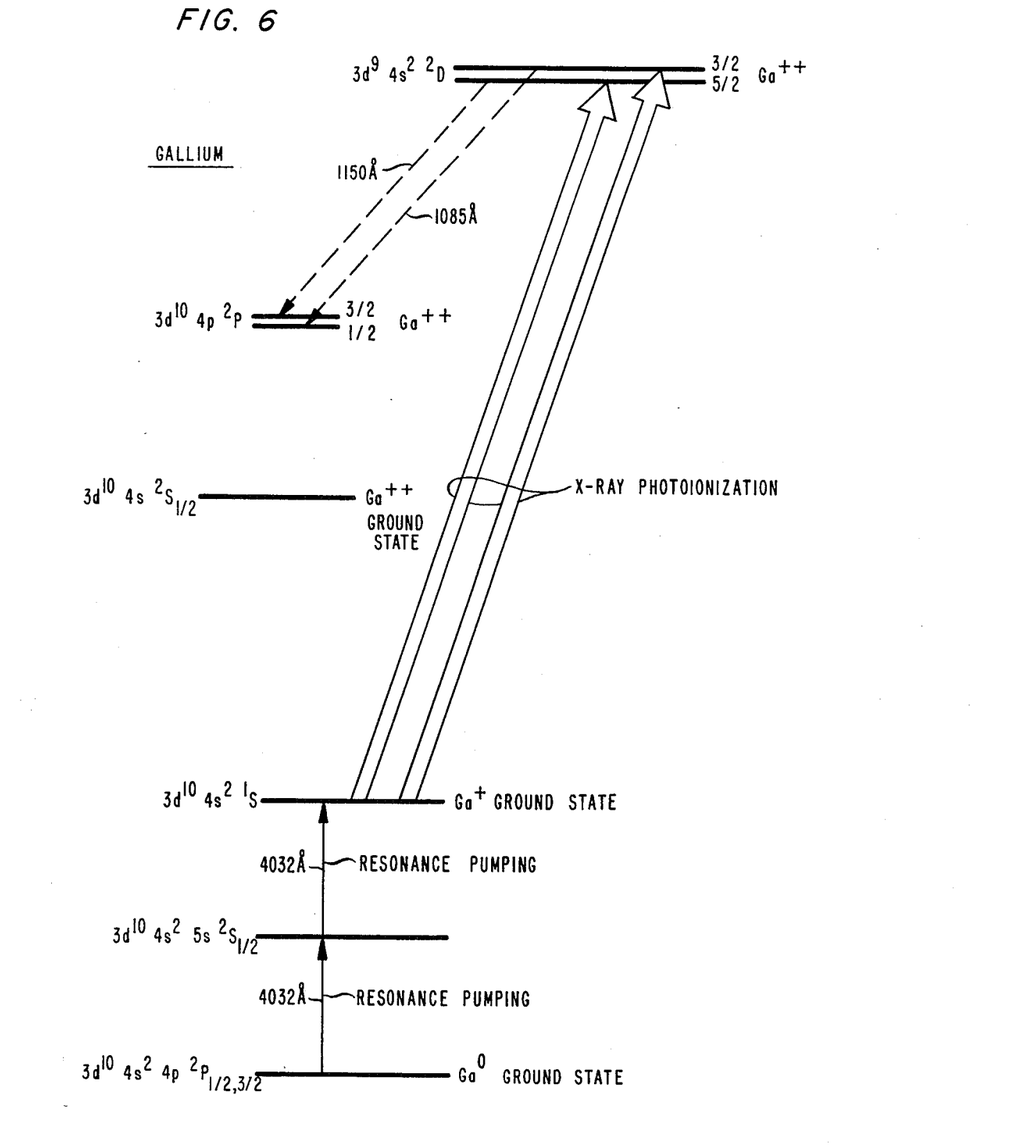

Take, for example, the energy level diagram of Ga shown in FIG. 6. The target state is the Ga+ ground state $3d^{10}4s^2\ ^1S$. The upper laser levels are $3d^94s^2\ ^2D_{3/2}$ and $^2D_{5/2}$ Ga++ states, respective lower laser levels are $3d^{10}4p\ ^2P_{\frac{1}{2}}$ and $^2P_{3/2}$ Ga++ states which are optically coupled by allowed transitions at 1085 Å and 1150 Å, respectively. X-ray photoionization removes inner-shell 3d-electrons from Ga+ ions in the ground state and further ionizes them to the Ga++ upper laser levels. However, in order to get Ga+ ions into the ground state (target state), resonance pumping at 4032 Å by a well-known dye or Raman-shifted excimer laser may be used to ionize Ga neutral atoms in the neutral ground state stepwise to the intermediate $3d^{10}4s\ ^25s\ ^2S_{\frac{1}{2}}$ state and then to the Ga+ ground state, or by direct photoionization with an excimer laser.

Figure 7:
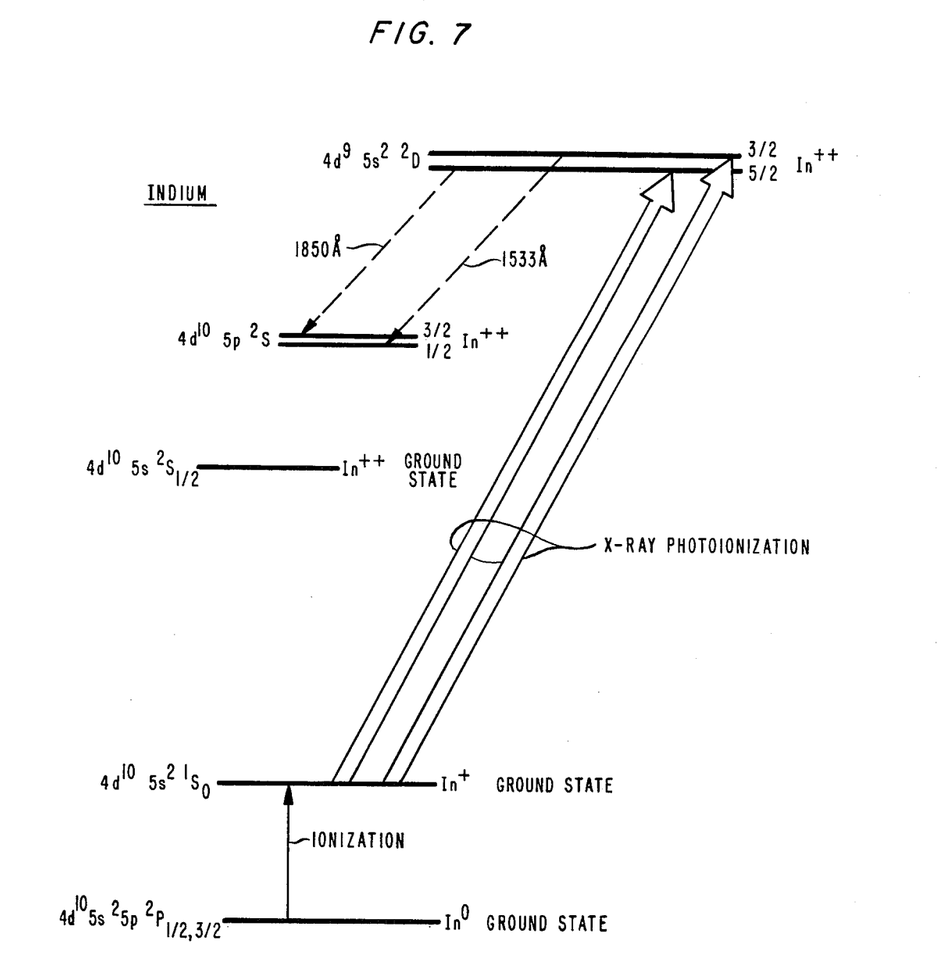

In a similar fashion, the In energy level diagram is shown in FIG. 7. Here, the target state is the In+ ground state $4d^{10}5s^2\ ^1S^0$. A sufficient population of In+ ground state ions is created by ionization of In neutral atoms in the neutral ground states $4d^{10}5s\ ^25p\ ^2P_{\frac{1}{2}}$ and $^2P_{3/2}$. Ionization may be achieved in a number of ways including by a laser plasma directed at an In target within the laser tube. As before, X-ray photoionization preferentially removes an inner-shell 4d-electron from the In+ ground state and further ionizes them to the In++ upper laser levels $4d^95s^2\ ^2D_{3/2}$ and $^2D_{5/2}$ which are optically coupled to respective lower laser levels $4d^{10}5p\ ^2P_{\frac{1}{2}}^0$ and $^2P_{3/2}^0$ by transitions at 1533 Å and 1850 Å, respectively.

EXAMPLE I

This example describes a Cd ion laser which oscillates at 4416 Å and 3250 Å and which relies on X-ray photoionization to remove preferentially inner-shell 4d-electrons.

A fortuitous energy level arrangement in Cd+ (see FIG. 3) places the $4d^95s^2\ ^2D$ levels above the $4d^{10}5p$ $^2P^0$ resonance levels of the Cd+ ion. The $^2D$ upper laser levels have a high photoionization cross-section from the Cd ground state ($\approx 15$ Mb peaked at 300 Å as shown in FIG. 2), whereas the photoionization cross-section to the $^2P^0$ lower laser levels is almost 100 times less. The branching ratio for the $^2D_{5/2}$ state (upper laser level for the 4416 Å laser) and $^2D_{3/2}$ state (upper laser level for the 3250 Å laser) is approximately 1.6–1.7:1. Transitions between the $^2D$ and $^2P^0$ states occur at 4416 Å and 3250 Å as shown in FIG. 3. Since the oscillator strength coupling these levels is relatively low (approximately 0.01) due to the 2-electron nature of the transition described earlier, the relatively low gain cross-section ($\sim 10^{13}\ cm^2$) requires $^2D$ state populations approaching $10^{14}\ cm^{-3}$ to produce significant gains in a length of 1 cm. If a naturally occurring isotopic mixture of Cd is used, the large isotope shifts (greater than the Doppler widths) on these transitions require an even higher population since the two more abundant isotopes (Cd-112 and Cd-114) each have approximately $\frac{1}{4}$ of the total isotopic population.

The experimental arrangement used to produce high small-signal gains at 4416 Å and 3250 Å is shown in FIG. 1. A one-inch diameter stainless steel heat pipe in the shape of a cross was used to contain Cd vapor at pressures of approximately 1 to 15 Torr (400° to 500° C.). A 300 mJ pulse at 1.06 μm from a Q-switched Nd:YAG laser 30 was directed down the axis of transverse segment 12 and was focused with a 25 cm focal length lens 32 to a 200 μm diameter spot onto a tungsten target 36 located near the intersection between transverse segment 12 and longitudinal segment 10. The Nd:YAG laser intensity (approximately $1 \times 10^{11}$ W/cm$^2$) in the focal region was estimated to produce an approximate 12 eV soft X-ray source with an approximate black-body distribution peaked in the 200–300 Å region (see FIG. 2). Gain was observed in Cd vapor in two ways: (1) by passing a 0.5 mW cw probe beam from a well-known He-Cd discharge laser 42 operating at 4416 Å down the longitudinal segment 10 and through the region near the soft X-ray source (thus operating the apparatus as an amplifier), and (2) by installing an optical resonator (mirrors 20 and 22) around the plasma to demonstrate laser oscillation. The ends of the heat pipe along the axis of the optical cavity were fitted with windows 14 and 16 set at the Brewster's angle although these were unnecessary for some of the high gains observed. The resulting Cd laser and gain pulses were detected with a utilization device 26 which included a photomultiplier and oscilloscope arrangement having a 2 nsec risetime.

Figure 8:
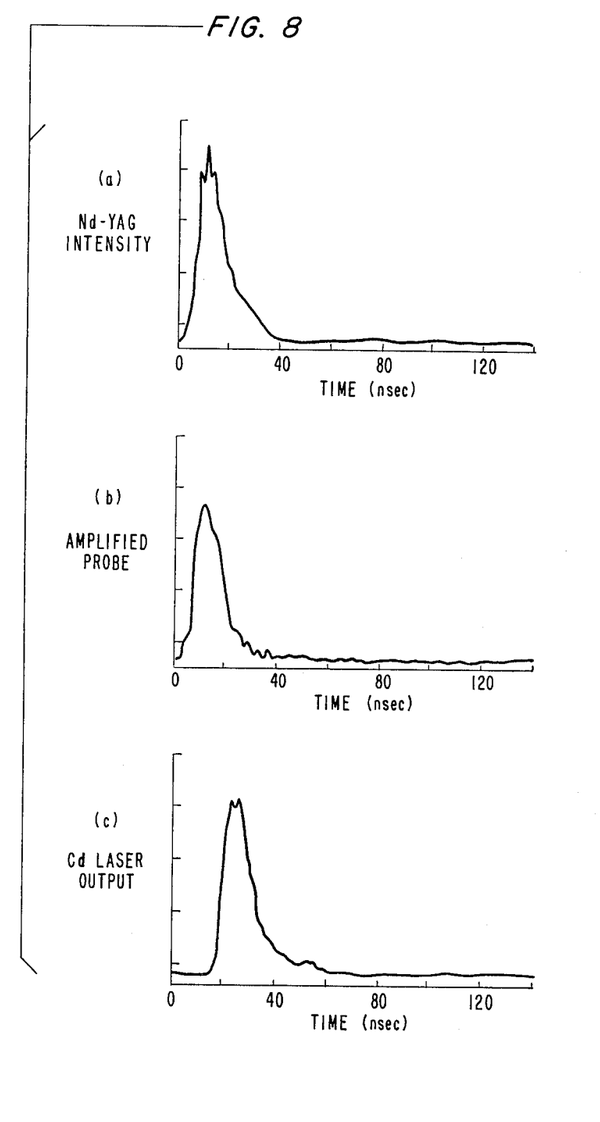
FIG. 8 relates to an inner-shell photoionization Cd laser and shows graphs of the time dependence of: (a) a 1.06 $\mu$m Nd:YAG laser used to form a plasma and also of the soft X-ray pumping flux emanating from that plasma; (b) the amplified cw Cd probe laser at 4416 Å; and (c) the Cd photoionization laser output with the optical cavity tuned at 4416 Å ($\sim$25 W peak)

FIG. 8(a) shows the time dependence of the pulse from the Nd-YAG laser 30 at 1.06 μm which should correspond approximately to the time duration of the soft X-ray flux from the laser-produced plasma. These pulses were about 10 nsec in duration and were shorter than the lifetime of the $^2D$ upper laser levels. Lasing has also been observed using 70 psec pulses. FIG. 8(b) shows the time dependence of the gain produced by photoionization of the Cd vapor measured with the probe beam from the He-Cd probe laser 42. The largest measured small-signal gain produced by the photoionization process (an amplification factor of 270 at a height of 5 mm above the target) implies a small-signal gain coefficient of 5.6 cm$^{-1}$ (active length $\approx 1$ cm). The duration of the gain can be seen from FIG. 8(b) to be approximately 12 nsec at that height. An absorption feature was also observed at later times and was attributed to the arrival of the expanding plasma produced at the tungsten target surface. The variation in the delay of this absorption feature with height above the target suggests a plasma expansion velocity of $3 \times 10^6$ cm/sec.

FIG. 8(c) shows the output from the Cd photoionization laser when a 65 cm long optical cavity (two 2 m radius-of-curvature mirrors 20 and 22 with mirror 22 being 5% transmitting at 4416 Å) was installed around the gain region. For the mirror separation used, it was estimated that 5–6 passes through the gain region occurred during the buildup of the laser pulse. The power output was 50 W from a plasma volume of 1 cm$^3$. The strongest output occurred at the wavelengths corresponding to the two strongest isotopes of Cd.

An independent measurement of the gain was made by determining the ratio of the spontaneous emission with the rear mirror unblocked to that with it blocked. These ratios gave a gain-length (GL) product of 3.3 at 4416 Å (ratio of $5 \times 10^5$) and 1.7 at 3250 Å (ratio of $1 \times 10^3$) under the same pumping conditions. Although the absolute magnitude of the gain may not be extremely accurate, the ratio of the gain at 4416 Å to that at 3250 Å should be fairly accurate since the amplified 4416 Å light had not yet reached the saturation level.

The measured ratio is in good agreement with the ratio (1.6–1.7) determined from the photoionization and the gain cross-sections.

Figure 9:
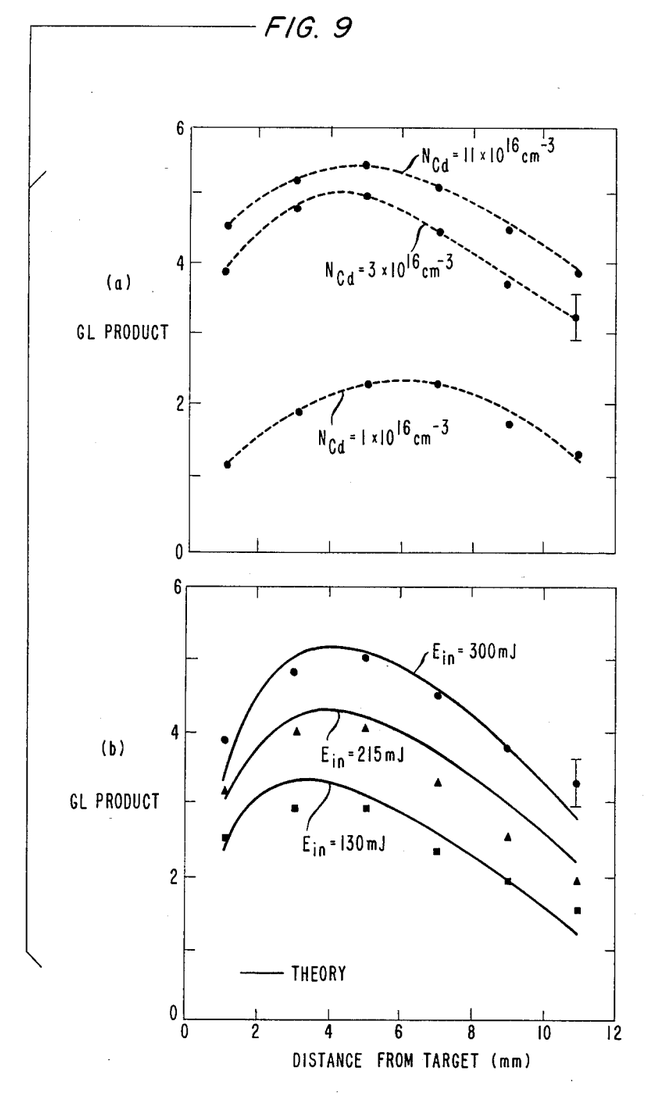
FIG. 9 also relates to an inner-shell photoionization Cd laser and shows graphs of the measured gain-length (GL) product at various distances from the soft X-ray source: Part (a) shows three different Cd densities and a 300 mJ 1.06 $\mu$m Nd:YAG laser input energy (dashed curves merely intended to guide the eye); and Part (b) shows three 1.06 $\mu$m Nd:YAG laser input energies and a Cd density of $3 \times 10^{16}$ cm$^{-3}$ (data points) together with calculated GL product (solid curves).

FIG. 9(a) shows the measured gain-length (GL) product versus distance from the tungsten target 36 for Cd densities of 1, 3 and $11 \times 10^{16}$ cm$^{-3}$ at a 1.06 μm input energy of 300 mJ. The Cd densities were measured by the well-known curve-of-growth technique (active length of the heat pipe $\approx 6$ cm). At the higher densities the GL product appears to saturate.

FIG. 9(b) shows the measured GL product versus distance from the target for three different values of 1.06 μm laser energy at a Cd density of $3 \times 10^{16}$ cm$^{-3}$. The increase in the GL product is seen to be slightly less than linear with increasing laser energy.

A plasma model was developed to predict the inversion density and the GL product for the particular geometry of this experiment. The results of the calculations for a Cd density of $3 \times 10^{16}$ cm$^{-3}$ are shown as solid curves in FIG. 9(b). The only adjustable parameters used in the calculation were the plasma temperature (i.e., the photoionization flux), the solid angle intercepted by the X-ray flux, and the electron collisional cross-section coupling the upper and lower laser levels. The values of these parameters providing the theoretical curve for the highest energy in FIG. 9(b) were a plasma temperature of 12 eV, a solid angle of $\pi/4$ (a 60° cone angle) and a cross-section 10 times greater than that expected from the well-known Seaton formula (which in this case is quite low due to the low oscillator strength connecting the upper and lower laser levels). The photoionizing X-ray flux in the model was reduced in proportion to the 1.06 μm Nd-YAG laser energy to obtain the curves of lower gain in FIG. 9(b).

The model is in reasonably good agreement with the experimental results. The lower gains near the target (where a higher gain might be expected due to the significantly higher pumping flux) result from electron collisions thermalizing the upper and lower laser levels. Other effects near the target (not considered in the model) that might lead to a decreased gain include stimulated emission and also hot electron penetration from the plasma X-ray source into the surrounding vapor. The decreasing gain further from the target is due to the reduced pumping flux from the diverging X-rays. The solid angle of the pumping flux that provides the best fit to the data ($\pi/4$) is consistent with gain probe measurements and with photographs of the plasma. The X-ray source does not pump larger solid angles in the present experiment because of shielding effects caused by cratering of the target surface. A rotating target should eliminate these effects and would probably increase this angle and improve the pumping efficiency.

The average population in the upper laser levels can be determined from the maximum measured gains and the known values of the gain cross-sections. Assuming a 1 cm$^3$ active volume, these values are $2.3 \times 10^{14}$ cm$^{-3}$ in the $^2D_{5/2}$ upper laser level and $1.3 \times 10^{14}$ cm$^{-3}$ in the $^2D_{3/2}$ upper laser level although the populations are probably greater than this is smaller regions near the target. This represents a total stored energy of $2 \times 10^{-4}$ J/cm$^3$ and suggests a potential laser output power of 10 kW/cm$^3$.

EXAMPLE II

Following experimental procedures similar to those of Example I, except that no Zn probe laser was available, the tube was filled with about 5 Torr of Zn at about 500° C. A small-signal gain of about 2 cm$^{-1}$ was measured, and lasing was observed at 5896 Å and 7481 Å between the $^2D_{3/2}$ and $^2P_i^0$ states and the $^2D_{5/2}$ and $^2P_{3/2}^0$ states, respectively. The X-ray pulses were approximately 10 nsec in duration.

It is to be understood that the above-described arrangements are merely illustrative of the many possible specific embodiments which can be devised to represent application of the principles of the invention. Numerous and varied other arrangements can be devised in accordance with these principles by those skilled in the art without departing from the spirit and scope of the invention.

What is claimed is:

1. Stimulated emission apparatus comprising
    means for providing atoms or ions in a target energy state which is absorptive of X-rays,
    the energy levels of said atoms or ions including upper and lower optically coupled laser levels, said upper level being nonmetastable, and
    means for generating population inversion between said upper and lower laser levels including means for generating X-rays having a wavelength effective to remove preferentially inner-shell d-electrons from said atoms or ions in said target state.

2. The apparatus of claim 1 wherein
    said target state providing means includes means for providing neutral atoms in a ground state corresponding to said target state, and
    said X-ray generating means ionizes said atoms directly into said upper laser level.

3. The apparatus of claim 2 wherein said generating means produces X-ray pulses having a duration shorter than the lifetime of said upper laser level.

4. The apparatus of claim 3 wherein said neutral ground state is a $^1S$ state of said atom, said upper laser level is a $^2D$ ion state and said lower laser level is a $^2P$ ion state.

5. The apparatus of claim 4 wherein said atoms are selected from the group consisting of Cd and Zn atoms.

6. The apparatus of claim 5 wherein said atoms comprise Cd atoms and the energy separation of said upper and lower laser levels corresponds to approximately 3250 Å and 4416 Å.

7. The apparatus of claim 5 wherein said atoms comprise Zn atoms and the energy separation of said upper and lower laser levels corresponds to approximately 5896 Å and 7481 Å.

8. The apparatus of claim 1 wherein
    said target state providing means includes means for providing neutral atoms in a ground state and means for ionizing said atoms to produce ions in a higher energy ion ground state corresponding to said target state, and
    said X-ray generating means further ionizes said ions directly into said upper laser level.

9. The apparatus of claim 8 wherein said generating means produces X-ray pulses having a duration shorter than the lifetime of said upper laser level.

10. The apparatus of claim 9 wherein said higher energy ion ground state is $^1S$ state of said atom, said upper laser level is a $^2D$ state and said lower laser level is a $^2P$ state.

11. The apparatus of claim 10 wherein said atoms are selected from the group consisting of Ga and In atoms.

12. The apparatus of claim 11 wherein said atoms comprise Ga atoms and the energy separation of said upper and lower laser levels corresponds to approximately 1150 Å and 1085 Å.

13. The apparatus of claim 11 wherein said atoms comprise In atoms and the energy separation of said upper and lower laser levels corresponds to approximately 1533 Å and 1850 Å.

14. The apparatus of claim 1 wherein
    said ions have an intermediate energy level to which they are excited by said X-ray generating means, said intermediate level being below said upper laser level, and
    said population inversion generating means further includes transfer laser means for exciting ions from said intermediate level to said upper laser level.

15. The apparatus of claim 14 wherein said transfer laser means applies to said ions optical pulses having a duration shorter than the lifetime of said upper laser level.

16. The apparatus of claim 15 wherein said intermediate state is a $^2D$ ion state, said upper laser level is a $^2P$ ion state and said lower laser level is a $^2S$ ion ground state.

17. The apparatus of claim 16 wherein said atoms are selected from the group consisting of Cd, Zn and Hg.

18. The apparatus of claim 17 wherein said atoms comprise Cd and the energy separation of said upper and lower laser levels corresponds to a wavelength of about 838–840 Å.

19. The apparatus of claim 18 wherein said transfer laser means applies optical pulses having a wavelength of approximately 2008 Å, 2252 Å or 2264 Å.

20. The apparatus of claim 18 wherein said transfer laser means applies optical pulses having a wavelength of approximately 1969 Å, 2081 Å or 2082 Å.

21. The apparatus of claim 18 wherein said transfer laser means applies optical pulses having a wavelength of approximately 1876 Å.

22. The apparatus of claim 17 wherein said atoms comprise Zn and the energy separation of said upper and lower laser levels corresponds to a wavelength of about 880–881 Å.

23. The apparatus of claim 17 wherein said atoms comprise Hg and the energy separation of said upper and lower laser levels corresponds to a wavelength of about 963 Å.

24. The apparatus of claims 1, 2, 3, 4, 5, 6, 7, 8, 9, 10, 11, 12, 13, 14, 15, 16, 17, 18, 19, 20, 21, 22, or 23 wherein said X-ray generating means comprises plasma means for generating essentially black-body radiation in a wavelength range of approximately 50–650 Å.

25. Stimulated emission apparatus comprising
    means for providing neutral atoms in a $^1S$ ground state, said atoms comprising a vapor phase of atoms selected from the group consisting of Cd and Zn and having
    a nonmetastable upper laser level corresponding to a singly ionized $^2D$ state and, optically coupled thereto, a lower laser level corresponding to a $^2P$ state, and
    means for generating a population inversion between said upper and lower laser levels comprising plasma means for generating X-ray pulses in a wavelength range of approximately 150–650 Å effective to remove preferentially inner-shell d-electrons from said neutral atoms in said $^1S$ ground state, thereby ionizing said atoms to said $^2D$ ion state, the duration of said pulses being shorter than the lifetime of said upper laser level.

26. The apparatus of claim 25 wherein said atoms comprise Cd, said neutral ground state is a $4d^{10}5s^2$ $^1S$ state, said upper laser levels are $4d^95s^2$ $^2D_{3/2}$ and $^2D_{5/2}$ states and said lower laser levels are $4d^{10}5p$ $^2P_{1/2}^0$ $and$ $_{3/2}^0$ states, and said upper and lower laser levels are coupled by allowed transitions at approximately 3250 Å and 4416 Å, respectively.

27. The apparatus of claim 25 wherein said atoms comprise Zn, said neutral ground state is a $3d^{10}4s^2$ $^1S$ state, said upper laser levels are $3d^94s^2$ $^2D_{3/2}$ and $^2D_{5/2}$ states and said lower laser levels are $3d^{10}4p$ $^2P_{1/2}^0$ and $^2P_{3/2}^0$ states, and said upper and lower laser levels are coupled by allowed transitions at approximately 5896 Å and 7481 Å, respectively.

* * * * *

UNITED STATES PATENT AND TRADEMARK OFFICE
CERTIFICATE OF CORRECTION

PATENT NO. : 4,592,064

DATED : May 27, 1986

INVENTOR(S) : William T. Silfvast

It is certified that error appears in the above-identified patent and that said Letters Patent is hereby corrected as shown below:

Column 9, line 63, "state" should read --ion state--.

Column 9, line 64, "state" should read --ion state--.

Signed and Sealed this

Fifth Day of September, 1989

Attest:

DONALD J. QUIGG

Attesting Officer

Commissioner of Patents and Trademarks